United States Patent
Cairns

(10) Patent No.: US 9,673,605 B2
(45) Date of Patent: Jun. 6, 2017

(54) BOOT SEAL

(71) Applicant: PONTUS SUBSEA CONNECTORS LLC, Ormond Beach, FL (US)

(72) Inventor: James L. Cairns, Ormond Beach, FL (US)

(73) Assignee: Pontus Subsea Connectors LLC, Ormond Beach, FL (US)

(*) Notice: Subject to any disclaimer, the term of this patent is extended or adjusted under 35 U.S.C. 154(b) by 2 days.

(21) Appl. No.: 15/093,002

(22) Filed: Apr. 7, 2016

(65) Prior Publication Data
US 2016/0329694 A1 Nov. 10, 2016

Related U.S. Application Data

(60) Provisional application No. 62/156,371, filed on May 4, 2015.

(51) Int. Cl.
H02G 15/04 (2006.01)

(52) U.S. Cl.
CPC ................... *H02G 15/046* (2013.01)

(58) Field of Classification Search
USPC ............................................ 174/76, 77 R, 87
See application file for complete search history.

(56) References Cited

U.S. PATENT DOCUMENTS

| | | |
|---|---|---|
| 2,082,489 A | 6/1937 | Goldsmith |
| 2,634,923 A | 4/1953 | Taylor, Jr. |
| 3,158,379 A | 11/1964 | Nava et al. |
| 3,324,449 A | 6/1967 | McLoad |
| 3,445,580 A | 5/1969 | Lusk |
| 3,508,188 A | 4/1970 | Buck |
| 3,522,576 A | 8/1970 | Cairns |
| 3,643,207 A | 2/1972 | Cairns |
| 3,729,699 A | 4/1973 | Briggs et al. |
| 3,772,636 A | 11/1973 | Webb |
| 3,845,450 A | 10/1974 | Cole |
| 3,877,775 A | 4/1975 | Barlow |
| 3,946,805 A | 3/1976 | Peterman |
| 3,963,297 A | 6/1976 | Panek et al. |
| 4,085,993 A | 4/1978 | Cairns |
| 4,142,770 A | 3/1979 | Butler, Jr. et al. |
| 4,188,084 A | 2/1980 | Buresi et al. |
| 4,298,415 A * | 11/1981 | Nolf .................... B29C 61/0641 156/85 |
| 4,373,767 A | 2/1983 | Cairns |
| 4,390,229 A | 6/1983 | Chevalier |

(Continued)

FOREIGN PATENT DOCUMENTS

EP 0229102 B1 7/1987
WO 2014195239 A1 11/2014

*Primary Examiner* — William H Mayo, III
*Assistant Examiner* — Krystal Robinson
(74) *Attorney, Agent, or Firm* — Marc S. Kaufman; Mark T. Vogelbacker

(57) ABSTRACT

The boot seal may include an elastomeric body constrictively stretched over an end of a cable and a retainer to grip the cable. The retainer may be a body having a central opening to receive the cable and have a plurality of inclined tines extending radially inwardly from the body with the inclined tines having distal ends forming the central opening. The elastomeric body may have a first sleeve on an end of the boot seal for receiving the end of the cable.

18 Claims, 3 Drawing Sheets

(56) References Cited

U.S. PATENT DOCUMENTS

| | | | |
|---|---|---|---|
| 4,422,890 A * | 12/1983 | Penneck | B29C 61/06 138/103 |
| 4,523,899 A | 6/1985 | Ouchi | |
| 4,529,257 A | 7/1985 | Goodman | |
| 4,588,247 A | 5/1986 | Grappe et al. | |
| 4,606,603 A | 8/1986 | Cairns | |
| 4,626,067 A | 12/1986 | Watson | |
| 4,666,242 A | 5/1987 | Cairns | |
| 4,795,359 A | 1/1989 | Alcock et al. | |
| 4,859,196 A | 8/1989 | Durando et al. | |
| 4,940,416 A | 7/1990 | Wagaman et al. | |
| 4,948,377 A | 8/1990 | Cairns | |
| 5,113,037 A * | 5/1992 | King, Jr. | H01R 4/22 174/87 |
| 5,171,158 A | 12/1992 | Cairns | |
| 5,194,012 A | 3/1993 | Cairns | |
| 5,203,805 A | 4/1993 | Cairns | |
| 5,334,032 A | 8/1994 | Myers et al. | |
| 5,344,337 A | 9/1994 | Ritter | |
| 5,347,089 A * | 9/1994 | Barrat | B29C 61/0641 156/49 |
| 5,410,104 A | 4/1995 | Gretz et al. | |
| 5,458,507 A | 10/1995 | Colescott et al. | |
| 5,484,296 A | 1/1996 | Taylor | |
| 5,558,296 A | 9/1996 | Sasaki et al. | |
| 5,577,926 A | 11/1996 | Cox | |
| 5,645,438 A | 7/1997 | Cairns | |
| 5,645,442 A | 7/1997 | Cairns | |
| 5,685,727 A | 11/1997 | Cairns | |
| 5,722,842 A | 3/1998 | Cairns | |
| 5,738,535 A | 4/1998 | Cairns | |
| 5,899,765 A | 5/1999 | Niekrasz et al. | |
| 6,196,854 B1 | 3/2001 | Hand | |
| 6,315,461 B1 | 11/2001 | Cairns | |
| 6,332,787 B1 | 12/2001 | Barlow et al. | |
| 6,464,405 B2 | 10/2002 | Cairns et al. | |
| 6,561,268 B2 | 5/2003 | Jones | |
| 6,736,545 B2 | 5/2004 | Cairns et al. | |
| 6,796,821 B2 | 9/2004 | Cairns et al. | |
| 6,929,404 B2 | 8/2005 | Jones et al. | |
| 7,112,080 B2 | 9/2006 | Nicholson | |
| 7,182,617 B1 | 2/2007 | Cairns et al. | |
| 7,285,003 B2 | 10/2007 | Cairns et al. | |
| 7,344,316 B2 | 3/2008 | McKinnon | |
| 7,364,448 B2 | 4/2008 | Cairns et al. | |
| 7,429,193 B2 | 9/2008 | Cairns et al. | |
| 7,464,728 B2 | 12/2008 | Cairns | |
| 7,690,936 B1 | 4/2010 | Snekkevik et al. | |
| 7,695,301 B2 | 4/2010 | Mudge, III et al. | |
| 7,769,265 B2 | 8/2010 | Cairns | |
| 7,794,254 B2 | 9/2010 | Marklove et al. | |
| 8,192,089 B2 | 6/2012 | Cairns et al. | |
| 8,292,645 B2 | 10/2012 | Cairns | |
| 8,324,502 B2 | 12/2012 | Kameda et al. | |
| 8,376,765 B2 | 2/2013 | Chaize | |
| 8,702,439 B1 | 4/2014 | Paulsel et al. | |
| 8,731,362 B2 | 5/2014 | Cairns | |
| 8,731,363 B2 | 5/2014 | Cairns | |
| 8,816,196 B2 | 8/2014 | Williams et al. | |
| 8,899,841 B2 | 12/2014 | Cairns | |
| 8,944,082 B2 | 2/2015 | Cairns | |
| 9,116,323 B2 | 8/2015 | Cairns | |
| 9,263,824 B2 | 2/2016 | Cairns | |
| 2002/0123256 A1 | 9/2002 | Brickett | |
| 2003/0139087 A1 | 7/2003 | Sprunger | |
| 2003/0193190 A1 * | 10/2003 | Werth | F16L 33/225 285/243 |
| 2007/0084620 A1 * | 4/2007 | King | H01R 4/22 174/87 |
| 2008/0113543 A1 | 5/2008 | Tsuji et al. | |
| 2008/0274636 A1 | 11/2008 | Marklove et al. | |
| 2009/0025977 A1 | 1/2009 | Anderson et al. | |
| 2011/0005839 A1 | 1/2011 | Marchand et al. | |
| 2014/0024250 A1 | 1/2014 | Spencer et al. | |
| 2014/0096992 A1 | 4/2014 | Williams et al. | |
| 2014/0270674 A1 | 9/2014 | Cairns | |

* cited by examiner

BOOT SEAL

CROSS-REFERENCE TO RELATED APPLICATION

This application claims the benefit under 35 U.S.C. §119 (e) of the earlier filing date of U.S. Provisional Patent Application No. 62/156,371 filed on May 4, 2015, the disclosure of which is incorporated by reference herein.

FIELD OF THE INVENTION

The invention relates generally to boot seals, as used, for example, to seal the ends of submarine cables within oil-filled terminations.

BACKGROUND

In many harsh environment oil-filled and pressure balanced cable-to-connector terminations the ends of cables penetrate an oil-filled compensation chamber. Boot seals are used within the compensation chamber to seal electrical conductor junctions and the area where individual conductors break out from the cable end. In addition to providing an electrically insulating barrier, the seals are intended to keep the oil from escaping into the cable's interstices. Such oil loss can quickly lead to chamber collapse and catastrophic termination failure. Prior art elastomeric breakout boot seals are easily displaced from their sealing position, and therefore do not have the reliability required for many applications. There is, therefore, a need for boot seals that remain in sealing position on the cable end to which they are installed.

Examples of both simple and breakout elastomeric boot seals can be seen in the subsea product offerings of DP Seals, Ltd. A typical prior-art cable-end, elastomeric, breakout boot seal is illustrated in FIG. 1. It consists of a sleeve 290a which is constrictively stretched over the end of cable 3. The environmental fluid pressure $P_f$, which is the fluid pressure external to the boot seal, has the effect of unseating the rear portion of sleeve 290a from cable 3. However, there is a pressure $P_f P_s$, where $P_s$ is the "stretch" pressure of constrictive elastomeric sleeve 290a upon cable 3. The stretch pressure $P_s$ works in cooperation with the external pressure $P_f$ to keep the sleeve 290a seated. Since $(P_f+P_s) \geq P_f$ in all cases, the rearward portion of sleeve 290a will not be unseated by external pressure $P_f$ and the seal will not fail in that mode no matter how great the external pressure $P_f$. The same reasoning is true for all elastomeric boot seals wherein there is adequate stretch to conformably seat the sealing sleeve to the object over which it is stretched.

Individual conductor sleeves 250, which are integrally molded onto the heavy end-wall 490 of sleeve 290a, stretch over individual cable jacketed conductors 260. The same mechanism that worked to keep the interface between sleeve 290a and cable 3 sealed, keeps the interfaces between conductor sleeves 250 and jacketed conductors 260 sealed. That is, $(P_f+P_{s1}) \geq P_f$, where $P_{s1}$ is the stretch pressure that conductor sleeves 250 exert on respective jacketed conductors 260. It is assumed for purposes of this discussion that $P_{s1}$ is the same for each of conductor sleeves 250, although in an actual application each could be designed to be different. In any case, it is clear that no matter how great external pressure $P_f$ is, the various interfaces will remain sealed from the outside environment as long as the boot seal remains in position on the cable end.

Elastomeric breakout boot seals like that shown in FIG. 1 can be easily displaced and unseated in the case of rough handling or, as discussed in U.S. Pat. No. 6,796,821 ("the '821 patent") incorporated by reference herein, if there is an overpressure within the cable to which they are attached. Such cases of unseating due to overpressure within the cable are more likely when external pressure $P_f$ is small. In the case of subsea cables, that means either when the cable is not submerged, or when it is in shallow water. Some overpressure within the cable can occur even in light-duty operations due, for instance, to gas expansion within the cable itself. There are process-type breakout boot seals, such as the adhesive heat-shrink products manufactured by Tyco-Raychem, which sealably adhere to the cable, and are not as easily displaced. But using process-type boot seals is not always practical; for instance, when the cable jacket cannot be adhered to, or when the seal must be installed in conditions detrimental to the sealing process.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well-known in the art, and because they do not facilitate a better understanding of the invention, a description of such elements is not provided herein.

Figure 1:
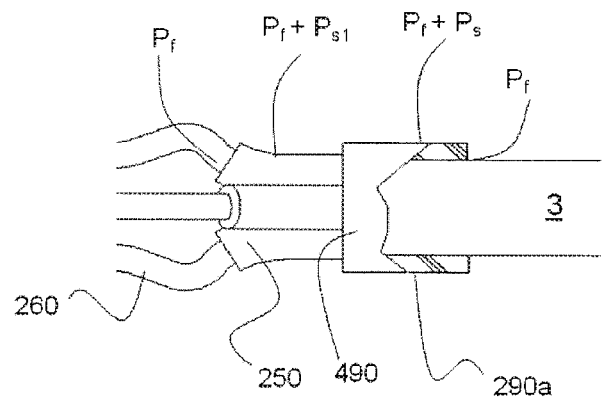
FIG. 1 illustrates a typical prior-art breakout boot seal disposed on an end of a cable.
Figure 2:
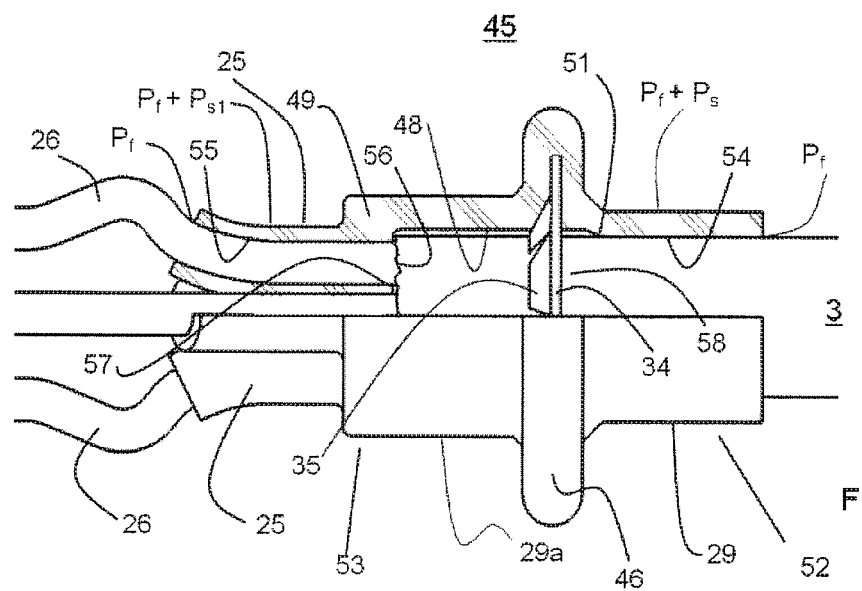
FIG. 2 is an axial quarter-section view of a breakout boot seal disposed on an end of a cable according to embodiments of the invention.

FIGS. 2-7 illustrate various embodiments of the invention. FIG. 2 shows a field-installable, elastomeric, cable-end breakout boot seal 45 which, for example, is a component of a harsh environment oil-filled and pressure balanced cableto-connector termination. Boot seal 45 can be made from most any elastomer, such as neoprene, natural rubber, or fluorosilicone rubber that is chemically compatible with the fluids and other materials with which it is in contact. Elastomeric boot seal 45 has a first elastomeric sleeve 29 on its rearward end 52 which is constrictively stretched over the end of cable 3. Boot seal 45 further has a second elastomeric sleeve 29a on its forward end 53. Individual conductor sleeves 25, which are integrally molded onto an end-wall 49 of second sleeve 29a, stretch over individual cable jacketed conductors 26 which issue from the end of cable 3 such that boot seal 45 simultaneously seals to the exterior surface of cable 3 and onto the jacketed conductors 26 issuing from the cable's end. Second sleeve 29a has an enlarged heavy-walled portion 46 having an outer diameter larger than outer diameters of first sleeve 29 and the remaining portion of second sleeve 29a.

Boot seal 45 further has an integral, positive retainer 34 that can be made from rigid flexible material such as thin metal or hard plastic which keeps boot seal 45 in place on cable 3. The retainer 34 does not rely on bonding or any other chemical processes. The retainer 34 is in the form of a push-nut fastener which is integral to heavy-walled portion 46 of second sleeve 29a of boot seal 45. Push-nut fasteners such as retainer 34 are widely available commercially, for instance from ARaymond Tinnerman.

Figure 3:
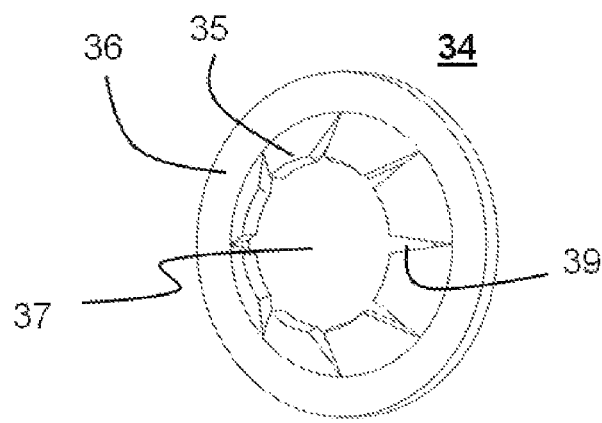
FIG. 3 illustrates a boot seal retainer according to embodiments of the invention.

Referring to FIG. 3, retainer 34 includes a circular peripheral body 36. Extending axially through the body 36 is a central opening 37. The opening 37 has a generally circular configuration and has an inner marginal periphery that is defined by a plurality of individual tab-like extensions or tines 35. The tines 35 are inclined radially inwardly from body 36 and cooperate to define a conical shape about the margin of opening 37. Tines 35 are separated from one another by recesses 39. Note that recesses 39 represent openings that keep retainer 34 from sealing to the outside surface of cable 3. Retainer 34 can either be molded in place or, in many cases, inserted into elastomeric boot seal 45 after molding. Post-mold insertion of retainer 34 is possible due to the elasticity of the boot seal. Referring now to FIGS. 2 and 3, the distal ends of tines 35 of retainer 34 forming opening 37 are disposed at a diameter which is less than the inner diameter 48 of heavy walled portion 46 of boot seal 45, and somewhat less than the outer diameter of cable 3. Inner diameter 48, in turn, is greater than the outer diameter of cable 3, thereby allowing distal tines 35 to project inward from inner diameter 48 and effectively grip cable 3.

Figure 6B:
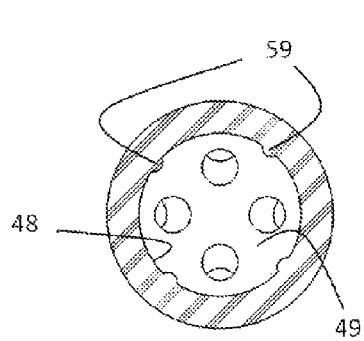
FIG. 6B is a radial cross section through line A-A of FIG. 6A demonstrating internal axial ventilation ribs according to embodiments of the invention.
Figure 6A:
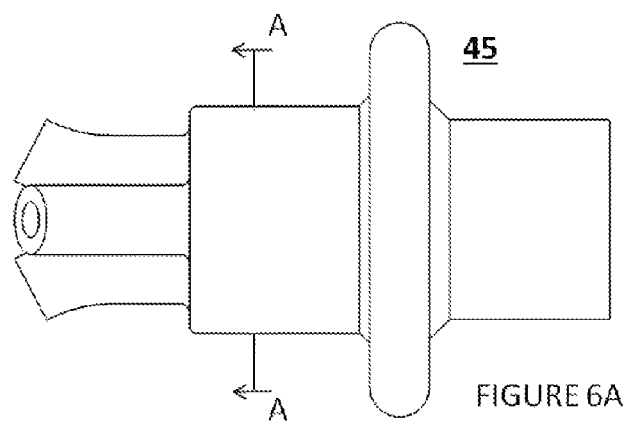
FIG. 6A is a side view of an elastomeric boot seal shown without a cable or retainer according to embodiments of the invention.
Figure 6C:
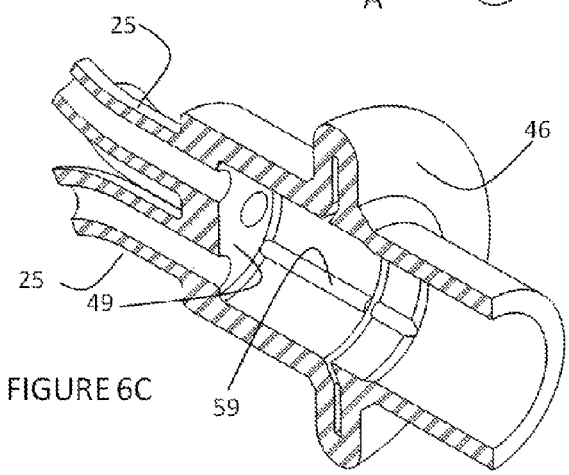
FIG. 6C is an axial half-section isometric view of the elastomeric boot seal of FIG. 6A shown without a cable or retainer further demonstrating internal axial ventilation ribs according to embodiments of the invention.

There's another advantage to having inner diameter 48 of boot seal 45 slightly larger than the outer diameter of cable 3. It is that sleeve portion 29a does not constrictively seal to cable 3. Under high pressure external to sleeve 29a, sleeve 29a will compress, possibly diminishing inner diameter 48 to the point where it conforms to the outer diametrical surface of cable 3. When thus compressed, the pressure exerted by sleeve 29a on cable 3 is $P_f$ minus whatever pressure is required to compress sleeve 29a. Said more simply, the maximum pressure that can be exerted by sleeve 29a on cable 3 is always less than $P_f$, therefore sleeve 29a does not seal to cable 3 along inner diameter 48 of sleeve 29a no matter how high $P_f$ becomes. As an added measure to ensure that sleeve 29a does not seal to cable 3 along inner diameter 48 of boot seal 45, axial ribs 59 as shown in FIGS. 6B and 6C can be provided. Ventilation between inner diameter 48 of boot seal 45 and the outer surface of cable 3 is important, because it provides that any material issuing from the end of cable 3 due to an overpressure $P_c$ within the cable is free to migrate to both sleeve 29 and to sleeves 25 where it will subsequently be released. As will be shortly discussed in detail, when $P_c$ exceeds a certain amount it will vent through one or the other of sleeves 25 or 29. It will be seen that the path through which it vents can be chosen by varying the parameters of the sleeves.

Figure 7:
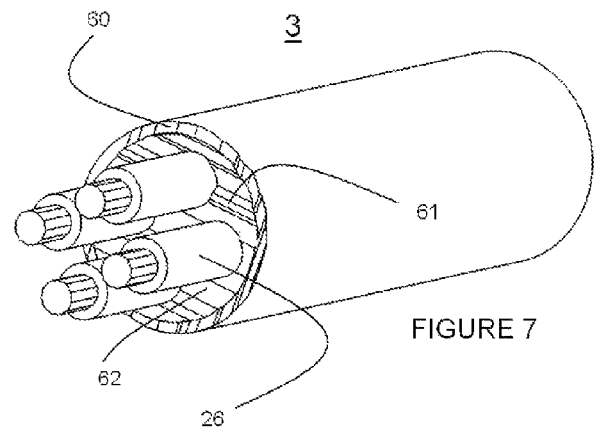
FIG. 7 is a cable segment showing one typical cable construction to demonstrate potential areas of interior pressure buildup within a cable.

There are many types of cable constructions. A typical one is illustrated in FIG. 7. The FIG. 7 cable consists of outer cable jacket 60 and inner jacketed conductors 26. The space 61 between jacketed conductors 26 and outer cable jacket 60 contains a filler 62 which may or may not be porous. In any case, pressure $P_c$ can build up along the interfaces between jacketed conductors 26 and filler 62, and/or within the interface between cable jacket 60 and the filler 62, and in the case of a porous filler, within filler 62 itself. Said more succinctly, pressure $P_c$ can possibly build up anywhere within space 61 between jacketed conductors 26 and outer cable jacket 60. The internal pressure $P_c$ within the cable may increase due to a variety of mechanisms. For example, the plastic jackets of jacketed conductors 26 within the cable can continue to outgas as they age, thus creating an internal pressure inside the cable; or mobile substances such as gel fillers or intruded water can migrate within cable 3 due to handling, also potentially increasing pressure $P_c$ in cable 3 within space 61. When $P_c$ exceeds a desired level, it is advisable to provide a release path to relieve $P_c$ without damaging or unseating boot seal 45. The only portions of boot seal 45 that seal to conductor jackets 26 and cable 3 issuing from boot seal 45 are individual conductor sleeves 25, and first sleeve 29, respectively. In common operations, end 56 of cable 3 is not smooth and flat because manually cutting the cable core material away from conductors 26 typically leaves a rough cable end 56 which does not seal to front inner wall 49 of diameter 48.

Figure 5:
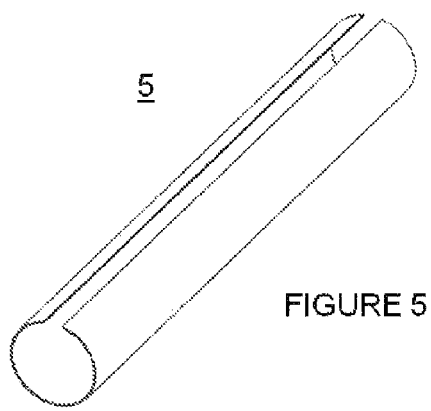
FIG. 5 illustrates a boot seal removal device according to embodiments of the invention.

The main function of retainer 34 is to retain boot seal 45 in place on the end of cable 3. Retainer 34 forms a one-way axial grip on cable 3, allowing cable 3 to be pressed through retainer 34 from the retainer's rearward end 58. Tines 35 on retainer 34 (FIG. 3) are angled forward, and are deflected radially outward by rearward entering cable 3. During assembly, boot seal 45 is pushed onto the end of cable 3, with jacketed conductors 26 being fed through respective individual conductor sleeves 25. Once pushed into place on the end of cable 3, retainer 34 keeps boot seal 45 from subsequently being forced off of the cable's end. If for some reason boot seal 45 needs to be removed from the cable, a thin, split, flexible tube 50 such as shown in FIG. 5 can be slid under first sleeve 29 and retainer 34 from the retainer's rearward end 58 to displace tines 35 outward, freeing cable 3. Tube 50 can be cut and rolled from suitable sheet material such as metal shim stock or thin, rigid plastic sheet. Retainer 34 keeps boot seal 45 in place against modest pressure $P_c$ internal to cable 3. Both the jacket 60 of cable 3, which might be made of materials such as neoprene, or polyethylene, and elastomeric boot seal 45 are formed of resilient material which may create some limitations regarding the retaining ability of retainer 34. The retaining ability can be enhanced by having multiple retainers 34 spaced axially along cable 3, but it still will be limited. However, if, while retainer 34 holds, the cable internal pressure $P_c$ exceeds either or both of $(P_f+P_{s1})$ and $(P_f+P_s)$, one or the other of individual conductor sleeves 25 or first sleeve 29 of boot seal 45 will unseat, allowing internal pressure $P_c$ to escape from the end 56 of cable 3 and then along interface 55 between conductor 26 and sleeve 25 or along interface 54 between first sleeve 29 and cable 3, thus relieving the pressure before unseating retainer 34. It can be seen that individual conductor sleeves 25 or first sleeve 29 may act as one-way seals.

Therefore, overpressure within the seals allows gas or fluid inside of them to leak outward, but environmental fluid will still not leak in. Therefore these seals make effective pressure relief valves. With the pressure adequately relieved, retainer 34 can retain boot seal 45 in position against the remaining internal cable pressure $P_c$. In some circumstances it might be desirable to choose which release or escape path the pressure-relieved material would follow; that is, it could release or escape by unseating first sleeve 29 and following a first release path from the end 56 of cable 3 and then along interface 54 between cable 3 and first sleeve 29, or by unseating one or more individual conductor sleeves 25 and following a second release path from the end 56 of cable 3 and then along interface 55 between one of sleeves 25 and its respective jacketed conductor 26, whichever is most advantageous for the application. Assuming that the external fluid pressure $P_f$ is nearly the same on each of individual conductor sleeves 25, the pressure relief would take place by unseating either first sleeve 29 and following a first release path along interface 54 or by unseating one of individual conductor sleeves 25 and following a second release path along interface 55, whichever sleeve has the least stretch pressure. Stretch pressure is a design parameter that can be controlled and determines through which one of the first or second release paths the boot seal 45 is designed to vent. For instance if it is advantageous to relieve the cable internal pressure $P_c$ rearwardly through the interface 54 between cable 3 and first sleeve 29, the stretch pressures of the boot seal sleeves are selected so that cable internal pressure is released through the first release path along interface 54. Looking still at FIG. 2, and again assuming that external pressure $P_f$ is nearly the same on every sleeve of boot seal 45, the boot seal sleeves can be designed so that $P_{s1} \gg P_s$. In other words, stretch pressure $P_s$ of first sleeve 29 on cable 3 is much less than that which the other sleeves exert on the objects over which they are constrictively stretched. In that case, any material forced outward from the cable 3 interior will pass out under first sleeve 29 into the external environment through the first release path along interface 54, and not into, for example, into a fluid chamber at the forward end 53 of boot seal 45. Likewise, if it is advantageous to relieve the cable internal pressure $P_c$ forwardly through the second release path along interface 55 into, for example, a fluid chamber, the boot seal sleeves are designed so that $P_s \gg P_{s1}$. When $P_s \gg P_{s1}$, the cable internal pressure $P_c$ is released through the interface between the exterior of the jacketed cable conductors 26 and the individual conductor sleeves 25 through interface 55. One simple way to control the stretch pressure on any sleeve is by increasing or decreasing its wall thickness and/or inner diameter. Thicker walls and/or smaller inner diameter sleeves exert more stretch pressure on the objects over which they are stretched, and thinner wall thicknesses and/or larger internal sleeve diameters exert less stretch pressure.

Figure 4:
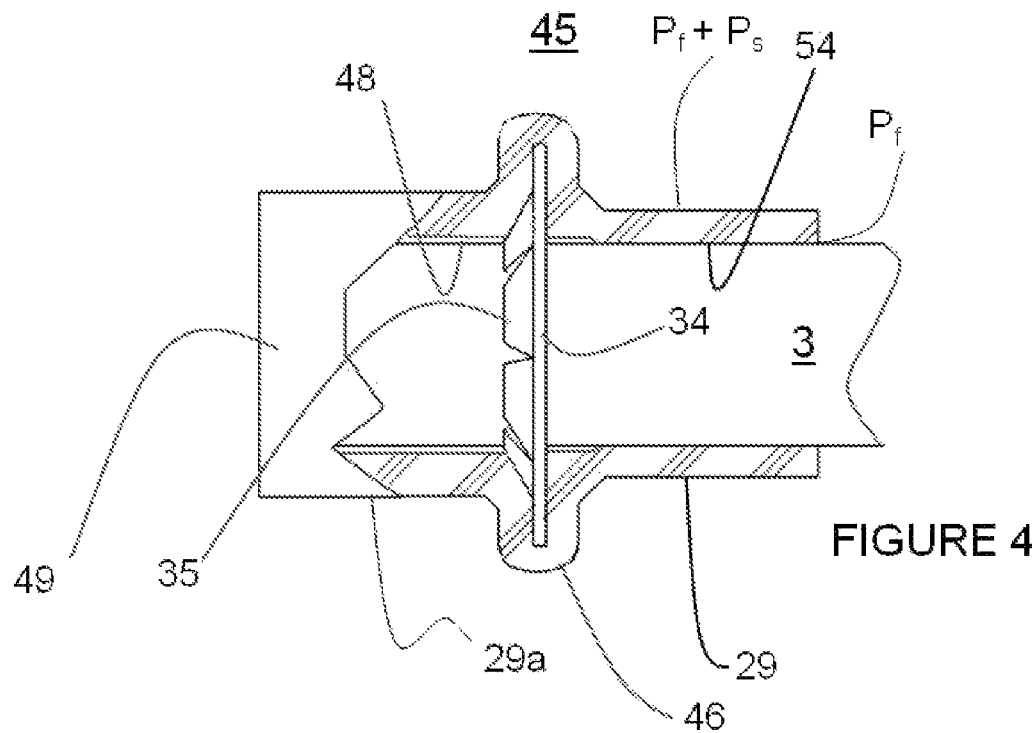
FIG. 4 illustrates a simple cable-end boot seal according to embodiments of the invention disposed on an end of a cable.

There are instances wherein cable-end boot seals are not used to break out conductors, such as just described, but instead are simply used to seal the ends of cables in harsh environments. FIG. 4 illustrates an embodiment of the invention that seals the cable end while being retained onto it by retainer 34. Cable overpressure is relieved into the outside environment following a release path rearwardly along interface 54 between the external surface of cable 3 and first sleeve 29.

The invention represents a simple, economical way to retain a cable-end boot seal in place during rough handling or in the case where there is an overpressure within the cable. Its advantages are that it is reliable, quickly and easily installed in most any working environment, and does not rely on any heat or chemical process-cured seals. It is easily installable and removable in the field with no special training or tools. Unlike process seals, it can also be removed easily and quickly if necessary, without damaging any components. It is resistant to a wide range of environmental temperature and pressure conditions due to its strictly mechanical operation. The boot seals of embodiments of the invention have a wide variety of applications including fluid-filled cable terminations. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A cable-end boot seal comprising:
   an elastomeric body for encapsulating an end of a cable and having an end wall and a first sleeve projecting rearwardly from the end wall wherein the first sleeve constrictively stretches over a portion of the cable jacket and,
   a retainer incorporated within the elastomeric body to retain the elastomeric body in position on the cable.

2. The boot seal of claim 1, wherein the retainer grips an outer surface of the cable without sealing to the outer surface.

3. The boot seal of claim 2, wherein the retainer comprises a plurality of inclined tines extending radially inwardly, and wherein the inclined tines have distal ends forming a central opening which is slightly smaller than an outer diameter of the cable.

4. The boot seal of claim 3, wherein the body includes a second sleeve having an outer diameter that is larger than the outer diameter of the cable, the second sleeve does not constrictively stretch over a portion of the cable, and wherein the second sleeve is a forward continuation of the first sleeve, and wherein the second sleeve has a heavy walled portion having an outer diameter larger than an outer diameter of the first sleeve and a remaining portion of the second sleeve.

5. The boot seal of claim 4, wherein the retainer is disposed in the heavy walled portion of the second sleeve.

6. The boot seal of claim 1, wherein the elastomeric body is configured to relieve internal pressure through a pressure release path.

7. The boot seal of claim 6, wherein at least one conductor sleeve extends forward from the end wall and constrictively stretches over a conductor.

8. The boot seal of claim 7, wherein a stretch pressure on the at least one conductor sleeve is less than a stretch pressure on the first sleeve, and wherein the pressure release path is along an interface between the at least one conductor sleeve and an outer surface of the conductor.

9. The boot seal of claim 7, wherein a stretch pressure on the at least one conductor sleeve is greater than a stretch pressure on the first sleeve, and wherein a relief path is along an interface between the first sleeve and the cable.

10. The boot seal of claim 1, wherein the elastomeric body comprises a second sleeve having an outer diameter that is larger than an outer diameter of the cable, the second sleeve does not constrictively stretch over a portion of the cable, and wherein the second sleeve is a forward continuation of the first sleeve, and wherein the second sleeve has a heavy walled portion having an outer diameter larger than an outer diameter of the first sleeve and a remaining portion of the second sleeve.

11. The boot seal of claim 10, wherein the retainer is disposed in the heavy walled portion of the second sleeve.

12. The boot seal of claim 11, wherein the elastomeric body is configured to relieve internal cable pressure through a pressure release path.

13. A device configured to attach to at least an end of a cable, the device comprising:
a body formed of elastomeric material and configured to surround at least an end of a cable, the body having a first end and an opposing second end, a longitudinal axis of the body extending from the first end to the second end, the first end including an end wall, the second end including a first sleeve configured to constrictively stretch over a portion of the cable; and
a retainer positioned within the body, the retainer being formed of a different material than the body, the retainer being configured to retain the body on the cable when a force is applied to the cable in at least one direction parallel to the longitudinal axis.

14. The device of claim 13, wherein the retainer includes a circular peripheral body and a central opening, a plurality of spaced-apart tines extending inwardly from the peripheral body to define the central opening.

15. The device of claim 14, wherein a distal end of the tines combine to form the central opening, an inner diameter of the central opening being less than an inner diameter of the body.

16. The device of claim 13, wherein the retainer is configured to permit the cable to move from the second end toward the first end.

17. The device of claim 13, wherein the body includes an enlarged portion between the first and second ends, the first end of the body including a first outer circumference, the enlarged portion of the body including a second outer circumference, the second end of the body including a third outer circumference, the first outer circumference being less than the second outer circumference, the first outer circumference being greater than the third outer circumference.

18. The device of claim 13, wherein at least a portion of the end wall extends radially outwardly from the longitudinal axis.

* * * * *